(12) United States Patent
Yukoku

(10) Patent No.: US 6,296,085 B1
(45) Date of Patent: Oct. 2, 2001

(54) DISK BRAKE

(75) Inventor: Shinichiro Yukoku, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/349,072

(22) Filed: Jul. 8, 1999

(30) Foreign Application Priority Data

Jul. 8, 1998 (JP) .................................................. 10-193198

(51) Int. Cl.$^7$ .................................................. F16D 65/38
(52) U.S. Cl. ...................................... 188/73.36; 188/73.38
(58) Field of Search ........................... 188/73.32, 73.35, 188/73.36, 73.37, 73.38, 73.39, 73.44, 73.45, 73.46

(56) References Cited

U.S. PATENT DOCUMENTS

| | | | |
|---|---|---|---|
| 3,285,371 | * 11/1966 | Cadiou | 188/73.32 |
| 3,391,761 | * 7/1968 | Brueder | 188/73.38 |
| 5,577,577 | * 11/1996 | Hirai et al. | 188/73.36 |

FOREIGN PATENT DOCUMENTS 8135696   5/1996   (JP) .

* cited by examiner

*Primary Examiner*—Robert J. Oberleitner
*Assistant Examiner*—Thomas J. Williams
(74) *Attorney, Agent, or Firm*—Greenblum & Bernstein P.L.C.

(57) ABSTRACT

A disk brake which can effectively suppress brake squeaks both during forward-travel braking and backward-travel braking. Pads having lugs at both ends of their back plates engaged in guide grooves formed in guide portions of a torque member are biased radially outwardly at the disk-leading side and radially inwardly at the disk-trailing side by resilient arms of liners. A torque-bearing portion at the disk-trailing side is disposed on the side near the center of the disk than is the line tangential to the disk and passing the center of a brake cylinder, whereas a torque-bearing portion at the disk-leading side is disposed on the outer side of the disk than is the tangential line to produce counterclockwise angular moment which can cancel clockwise angular moment during backward-travel braking.

1 Claim, 4 Drawing Sheets

DISK BRAKE

BACKGROUND OF THE INVENTION

This invention relates to a disk brake mounted on a motor vehicle, and more particularly a disk brake which is less likely to squeak during braking either while the car is moving forward or backward by improving the way in which the braking torque to the pads is borne. The terms "disk-leading side" and "disk-trailing side" herein used refer to the sides of the caliper at which the disk enter and exits the caliper, respectively, while the car is moving forward.

A disk brake of the type is known in which the pads to be brought into frictional contact with the disk are mounted so as be slidable in the axial direction of the disk between guide portions provided opposite to each other at the disk-leading and disk-trailing sides of the torque member or the caliper, and in which lugs at both ends of the back plates of the pads are engaged with guide grooves or protrusions of the guide portions to restrict the rotation of the pads, and the braking torque applied to the pads is borne by torque-bearing portions of the torque member or the caliper. A structure is proposed which can effectively suppress squeaking in unexamined Japanese patent publication 8-135696.

In this structure, as shown in FIG. 5, liners 11 are fitted in the guide portions 3 of the torque member 2 to urge the pads 1 radially outwardly with an arm 12 of the liner 11 at the disk-leading side and urge the pads 1 radially inwardly with an arm 12 of the liner 11 at the disk-trailing side. The torque-bearing portions 3a at the disk-leading and disk-trailing sides are located on the radially inner side (i.e. the side including the center of the disk) of the tangential line L of the disk that passes the center O of the brake cylinder (that is, center of pressing).

In the arrangement of FIG. 5, when the brake is applied while the car is moving forward, angular moment M1 produced by component forces Fay, Fby of the braking forces Fa and Fb applied to the disk at the disk-leading and disk-trailing sides, angular moment M2 produced when the center of the reaction force Fd shifts toward the center of the disk from the center of the tangential force Fc (which acts in the tangential direction of the disk) (this center is on the center of pressing O), and angular moment M3 produced by component forces fay, fby of the spring forces fa, fb of the resilient arms 12 are applied to the pads 1. The moments M1, M2, M3 are all counterclockwise. Thus, when the brake is applied while the car is traveling forward, the pads are prevented from pivoting. This effectively suppresses squeaking.

But when the brake is applied while the car is backing, the angular moments M1 and M2 act clockwise, while the moment M2 remains counterclockwise. Thus, when the combined force of the moments M1 and M2 overcomes the moment M3, the pads 1 may move, triggering vibrations of the pads 1. The brake thus begins to squeak. With a floating type disk brake of a type having its caliper 5 supported so as to be slidable in the axial direction of the disk by slide pins 7 (see FIG. 1), pin clearances are present at the caliper guide portions. But the pads move and the pin clearances disappear before predetermined torque-bearing portions are reached, so that the braking torque is borne by the pins. As a result, the line for bearing braking torque tends to become unstable. The brake thus tends to squeak. Thus, higher squeak-preventive effects are required for floating type disk brakes.

If the pad biasing directions at the disk-leading and disk-trailing sides were reversed from the illustrated arrangement to stop the movement of the pads during backward-travel braking, squeak-preventive effects during forward-travel braking which is more important would weaken. Thus, such an arrangement cannot be adopted.

An object of this invention is to increase the squeak preventive effects during backward-travel braking without sacrificing the squeak preventive effects during forward-travel braking.

SUMMARY OF THE INVENTION

According to this invention, there is provided a disk brake comprising a caliper, a disk, a torque member, a brake cylinder, a pair of pads adapted to be brought into frictional contact with the disk, the back plates being formed with lugs at both ends thereof, guide portions provided opposite to each other on the torque member or the caliper at its disk-leading and disk-trailing sides and having guide grooves or protrusions, the lugs being engaged with the guide grooves or protrusions to support the pads so as to be slidable in the axial direction of the disk, resilient members for biasing the pads radially inwardly at the disk-trailing side and radially outwardly at the disk-leading side, characterized in that a torque-bearing portion at the disk-trailing side is disposed on the side nearer to the center of the disk than is a line tangential to the disk and passing the center of the brake cylinder, and that a torque-bearing portion at the disk-leading side is disposed on the outer side of the disk than is the line.

Other features and objects of the present invention will become apparent from the following description made with reference to the accompanying drawings, in which:

DETAILED DESCRIPTION OF THE PREFERRED EMBODIMENT

Figure 1:
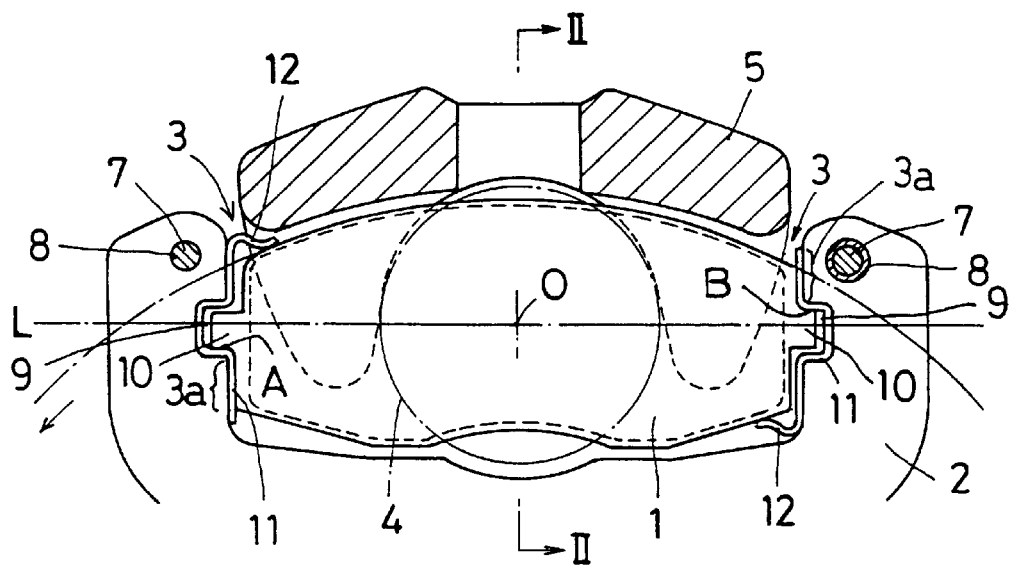
FIG. 1 is a front view of a disk brake embodying this invention shown with the inner side of the caliper removed
Figure 2:
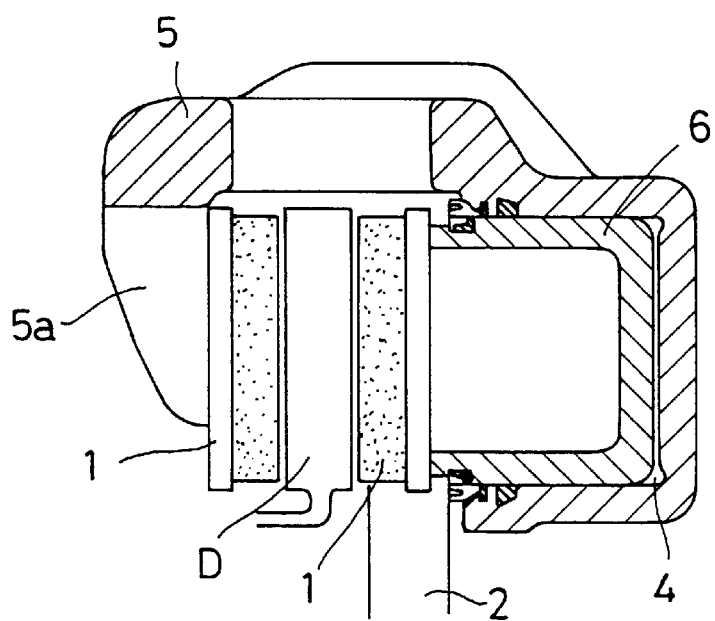
FIG. 2 is a sectional view taken along line II—II of FIG. 1
Figure 3:
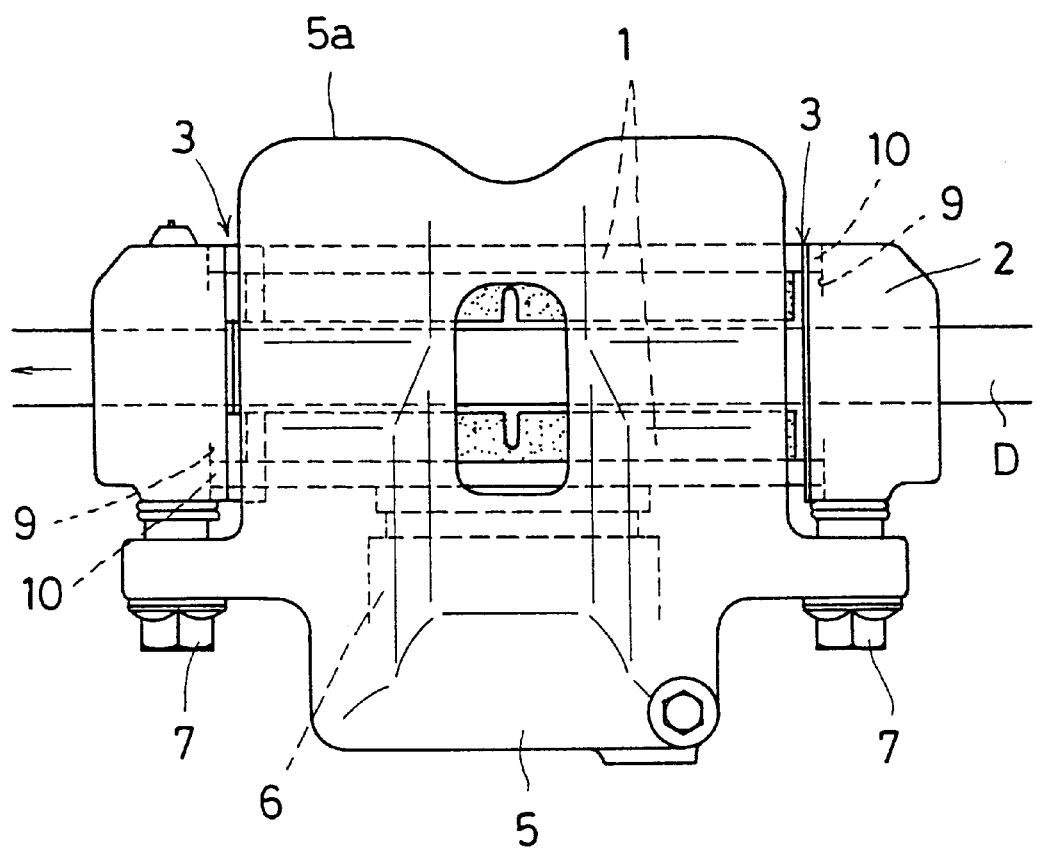
FIG. 3 is a plan view of the same.

FIGS. 1 to 3 show a disk brake embodying this invention.

The disk brake includes pads 1, a torque member 2 having guide portions 3 provided opposite to each other in the tangential direction of the disk, a caliper 5 formed with a brake cylinder 4, and a brake piston 6 received in the cylinder 4. Slide pins 7 have one end thereof fixed to the caliper 5.

The slide pins 7 are loosely inserted in guide holes 8 formed in the torque member 2, so that the caliper 5 is supported so as to be slidable in the axial direction of the disk.

The pads 1 on both sides of the disk rotor D (FIG. 2) include back plates having lugs 10 at both ends thereof that are engaged in guide grooves 9 (FIG. 1) formed in the torque member 2 and extending in the axial direction of the disk. The pads 1 are thus slidable in the axial direction of the disk.

As is well-known, in a floating type disk brake, the inner pad 1 is pushed by the brake piston 6 into frictional contact with the disk rotor D. At the same time, the caliper 5 is slid to the inner side by the reaction force, so that the outer pad 1 is pushed by an outer claw 5a of the caliper 5 into frictional contact with the disk rotor D (FIG. 2).

Figure 5:
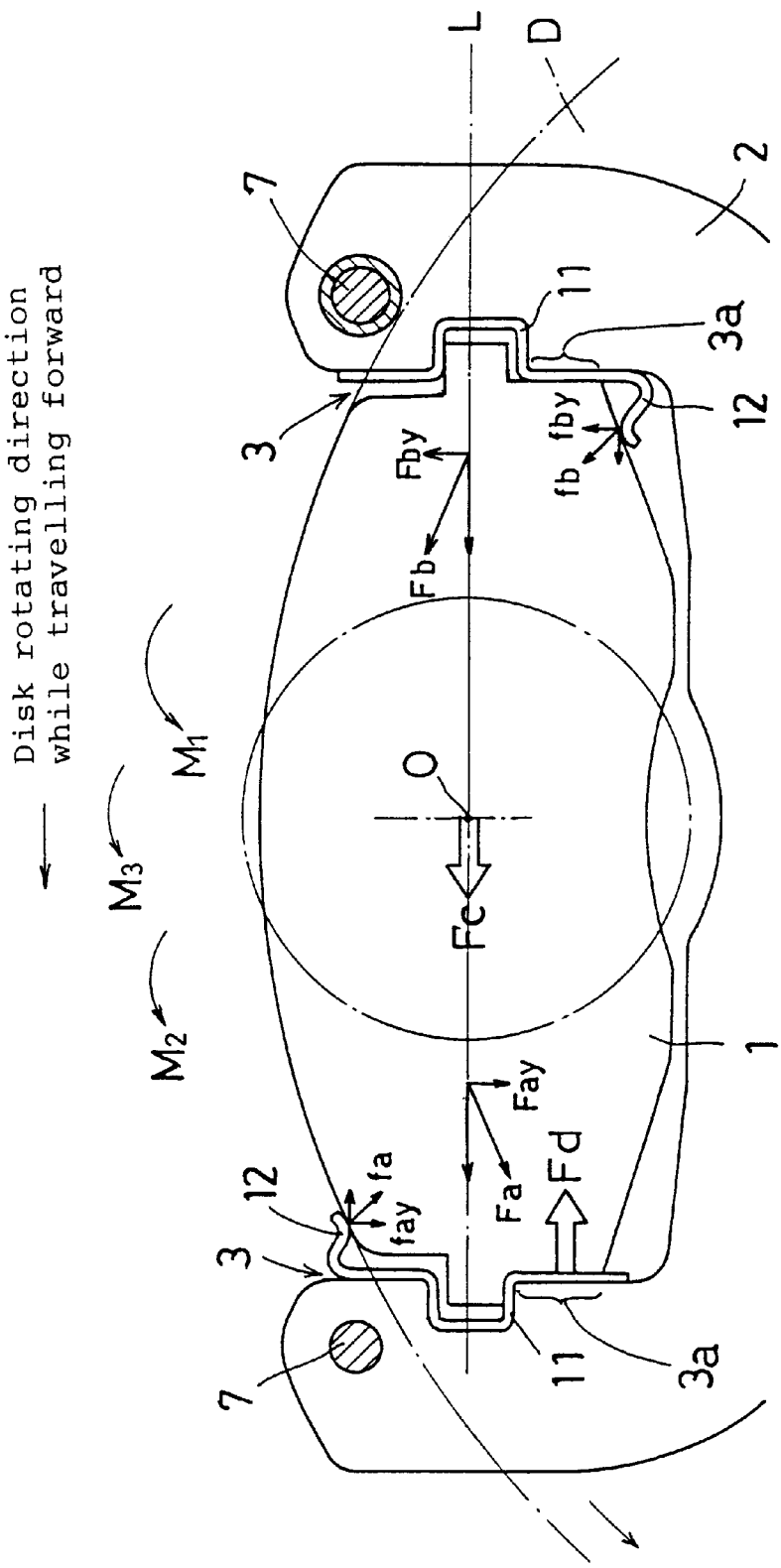
FIG. 5 is a similar view showing the operation of a conventional disk brake.

Liners 11 are mounted on the torque member 2 at its guide portions 3. The liners 11 have resilient arms 12 which bias the pads 1 at their disk-leading and disk-trailing sides to eliminate any play between the guide grooves 9 and the pads 1, thereby preventing rattling sounds while the car is traveling. The resilient arm 12 of the liner 11 at the disk-leading side biases the pad 1 radially outwardly, while the resilient arm 12 of the liner 11 at the disk-trailing side biases the pad radially inwardly, in the same way as in the prior art shown in FIG. 5. The pads 1 are thus maintained in the rotation-bound state during forward-travel braking beforehand.

Figure 4:
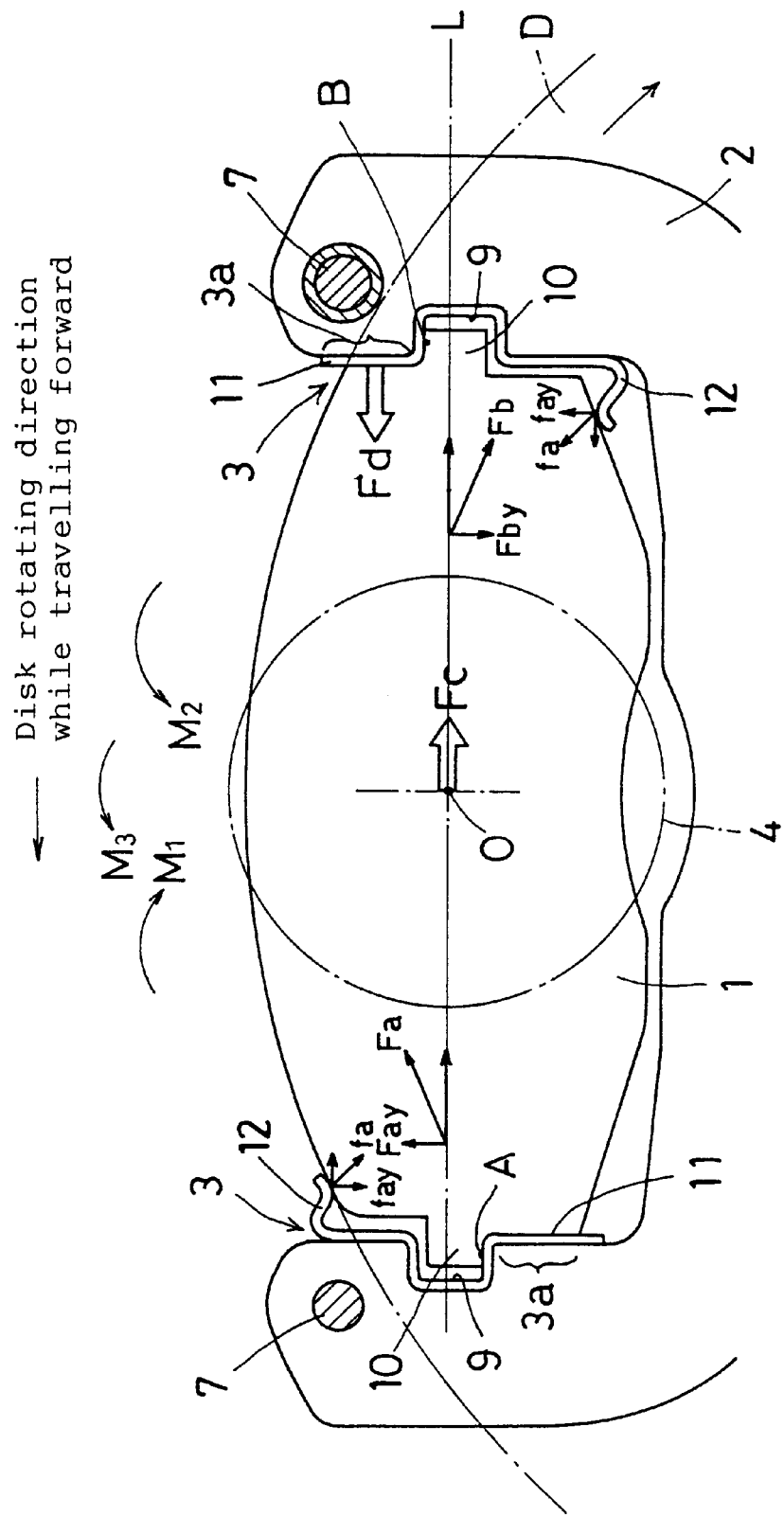
FIG. 4 is a view showing the operation of the brake of FIG. 1.

In the disk brake of FIG. 1, as a characterizing element of this invention, as shown in FIG. 4, the torque-bearing portion 3a at the disk-leading side (on the righthand side of the figure) is provided on the radially outer side (i.e. the side not including the center of the disk) of a line L tangential to the disk and passing the center O of the brake cylinder 4. The torque-bearing portion 3a at the disk-trailing side is disposed on the radially inner side (i.e. the side including the center of the disk) of the line L.

The pads 1 are pre-biased counterclockwise (in FIGS. 1 and 4) by the resilient arms 12 of the liners 11 and bound at points A, B. When the forward-travel braking starts in this state, counterclockwise (in the figures) angular moment is applied to the pads 1 due to the braking force. This increases the binding force at points A, B, thus preventing the movement of the pads at the initial stage of braking, which can trigger vibrations. This prevents brake squeals/squeaks. Also, since rotation restrictions at point A, B are done beforehand, clonking sounds are also prevented.

Next, during backward-travel braking, at the disk-trailing side (the disk is rotating clockwise now) torque is borne on the radially outer side of the line L of FIG. 1. Thus, as shown in FIG. 4, the angular moment M2 by the tangential force Fc and the reaction force Fd becomes opposite in direction to moment M1, so that the moments M1 and M2 will cancel each other. As a result, the angular moment M1 becomes zero or nearly zero, so that it is possible to prevent the movement of the pads 1 with the spring forces of the resilient arms even during backward-travel braking.

The guide grooves 9 of the guide portions 3 may be replaced with protrusions adapted to be engaged in recesses formed in the back plates of the pads 1.

The resilient members for biasing the pads 1 may be wire springs, and may not be integral with the liners 11.

The present invention is also applicable to a disk brake of the type having its guide portions mounted not on the torque member Lut on the caliper 5 to bear the braking force from the pads on the caliper.

As described above, according to this invention, a torque-bearing portion at the disk-trailing end is disposed on the side nearer to the center of the disk than is a line tangential to the disk and passing the center of the brake cylinder, and that a torque-bearing portion at the disk-leading end is disposed on the outer side of the disk than is the line. Thus, both during forward-travel braking and backward-travel braking, it is possible to effectively suppress brake squeaks by suppressing movement of the pads, which can trigger vibrations of the pads.

What is claimed is:

1. A disk brake comprising a caliper, a disk, a torque member, a brake cylinder, a pair of pads adapted to be brought into frictional contact with said disk, back plates formed with lugs at both ends thereof, guide portions provided opposite to each other on one of said torque member and said caliper at its disk-leading and disk-trailing sides and having one of guide grooves and protrusions, said lugs being engaged with said one of guide grooves and protrusions to support said pads so as to be slidable in the axial direction of the disk, resilient members for biasing said pads radially inwardly at the disk-trailing side and radially outwardly at the disk-leading side, and further comprising a torque-bearing portion at the disk-trailing side disposed on the side nearer to the center of the disk than is a line tangential to the disk and passing through the center of said brake cylinder, and a torque-bearing portion at the disk-leading side for bearing a force produced in a direction parallel to said tangential line is provided on the outer side of the disk than is said tangential line.

* * * * *